United States Patent [19]

Patterson et al.

[11] Patent Number: 5,098,233

[45] Date of Patent: Mar. 24, 1992

[54] CARBIDE SHANK BORING BAR WITH STEEL HEAD

[75] Inventors: Harvey L. Patterson, Santa Clarita; Reginald Quintana, Baldwin Park, both of Calif.

[73] Assignee: Circle Machine Company, Monrovia, Calif.

[21] Appl. No.: 604,810

[22] Filed: Oct. 29, 1990

[51] Int. Cl.⁵ .............................................. B23K 35/38
[52] U.S. Cl. .................................. 407/101; 76/101.1; 228/214; 228/218; 407/118
[58] Field of Search .............. 407/101, 118; 228/122, 228/124, 214, 215, 218; 76/101.1, 108.1, 108.2, 108.6, 115

[56] References Cited

U.S. PATENT DOCUMENTS 2,290,934  7/1942  Andreasson .................. 228/214 X
4,976,418 12/1990  Harville ........................... 269/43

FOREIGN PATENT DOCUMENTS 626749  7/1949  United Kingdom .............. 76/108.1

Primary Examiner—Steven C. Bishop
Attorney, Agent, or Firm—Harlan P. Huebner

[57] ABSTRACT

A carbide shank boring bar having a coolant/lubricant bore running axially therethrough fitted with a steel head, said head being machinable to produce a pocket to receive a metal cutter insert wherein said boring bar shank and said steel head have a diameter less than one-half inch and said head is brazed without flux to said boring bar and no flux residue remains in said coolant/lubricant bore upon completion of said brazing. The method of achieving the fusion includes using an atmospheric vacuum chamber to conduct the fusion.

10 Claims, 2 Drawing Sheets

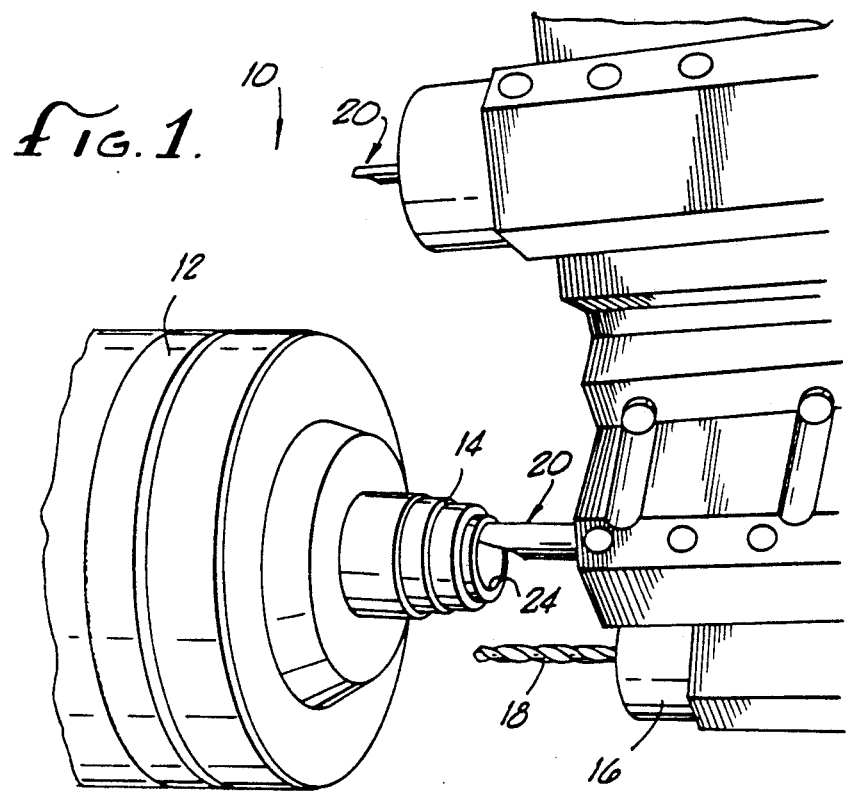
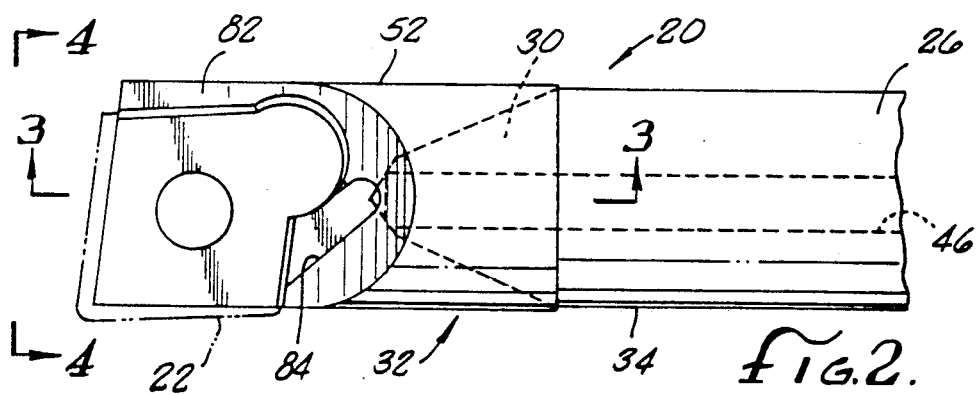
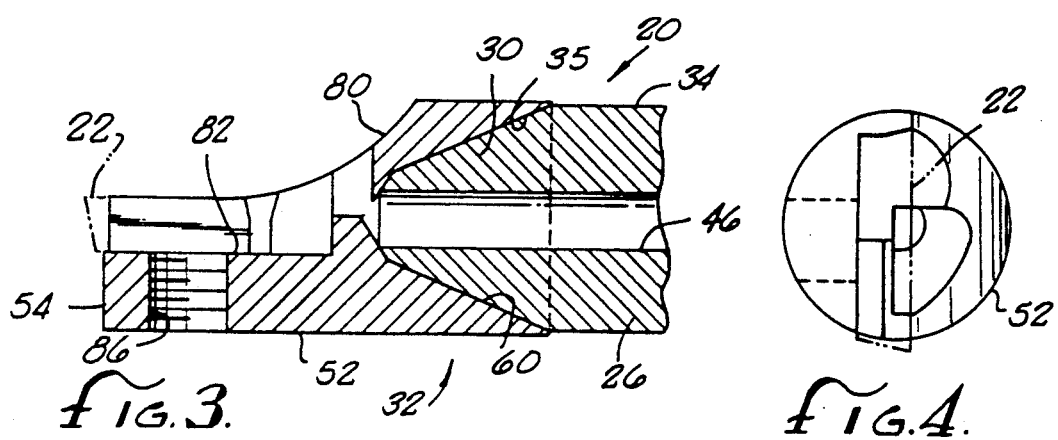

1

CARBIDE SHANK BORING BAR WITH STEEL HEAD

BACKGROUND OF THE INVENTION

1. Field of the Invention

This invention relates to a carbide rod or shank boring bar with an axial coolant/lubricating bore extending therethrough that is fitted with a steel head into which a pocket is founded to receive a cutting insert, and the bore communicates with the insert.

2. Description of the Prior Art

For purposes of this patent application, brazing will be considered as the oxide-free bonding of similar or dissimilar metals by a filler metal that has a lower melting point than the metals to be joined, but usually above 300° F. The brazing alloys used to accomplish the bonding of parts is also known as hard solders. Usually brazing is accomplished by hand torch, however it may also be done by induction heating. When using the prior art ambient air method of brazing a flux is always necessary to effect proper brazing by removing impurities from the metal. In the presence of oxygen the flux will oxidize forming a contaminant crust that can plug up holes and bores as well as coat parts and lessen capillary action.

In the formation of large diameter carbide boring bars with axial lubricated bores and steel heads with dimensions over ½ the brazing of the rod and head have been accomplished without much difficulty in ambient air. However, in all instances the brazing technique which uses silver brass has left oxidized flux in the lubricating hole. This has required additional time and expense in physically inserted an instrument in the bore to clean it out removing the flux.

In addition in the past the process could not be adapted to anything less than ½" rods because the axial lubricating bores are so small that no tool could fit into the bore and accomplish the cleaning out of the bore. Thus carbide boring bars with axial lubricating bores and steel heads in small diameter heretofore could not be provided. Therefore when using a small diameter carbide boring bar and steel head the cutting insert mounted within the pocket portion of the head had to be externally lubricated when it was cutting metal.

SUMMARY OF THE INVENTION

It is a purpose of the present invention to provide a carbide metallic boring bar with a steel head wherein the carbide bar has a bore running axially through the bar wherein the diameter of the bar may be of greater or less than ½ inch.

Another objection of the present invention is to provide a carbide boring bar with an axial coolant/lubricating bore and a steel head brazed to said bar wherein said lubricating bore does not fill with flux during the brazing operation.

A further object of the present invention is to provide a method of brazing a boring rod having an axial coolant/lubrication bore therethrough to a steel head which head is adapted to be formed with a pocket to receive a cutting insert and the pocket communicates with the bore wherein at the completion of the brazing no flux residue remains in the lubricating bore.

Another object of the present invention is to accomplish an oxygen free brazing without the need of flux of a boring bar with a coolant/lubricating bore and a steel head to hold a cutting insert to be accomplished within an atmospheric vacuum chamber. Such oxygen free brazing without the need for flux will allow the lubricating bore to remain unclogged.

A still further object of the present invention is to provide an interior construction of a steel head which when mated with the end of a carbide boring bar will adapt it to a better brazing of the two metals than heretofore. Also without the need for a flux no contaminants form on the surfaces to be brazed and thus greater capillary action is available. This creates a better bond of parts.

A further object of the present invention is to provide on the interior of a steel head an annular recess providing an increased area to receive a braze alloy during the oxygen free brazing operation with improved capillary action to assure an improved joining of the two metals.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 1 is an environmental view of the invention as it might be used in a metal cutting machine;

FIG. 2 is an enlarged top elevational view of a steel head end and a portion of a carbide boring bar affixed thereto;

FIG. 3 is a cross sectional view of FIG. 2 taken lines 3—3 of FIG. 2;

FIG. 4 is an end view of FIG. 2 taken on lines 4—4 of FIG. 2;

DETAILED DESCRIPTION OF THE PREFERRED EMBODIMENT

Figure 5:
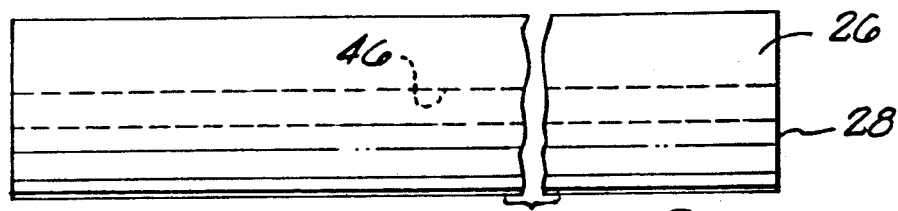
FIG. 5 is a side elevated view of a carbide boring bar blank with a lubrication bore passing axially therethrough.

In FIG. 1 there is illustrated a machine tool generally designated 10 which may be used to cut annular holes in metal parts. The tool 10 usually includes a work spindle 12 to which is secured a metal work piece 14. There is also a tool holder 16 of any conventional type possessed of chucks to hold tools such as a drill 18 or boring bars designated 20. The boring bar 20 is fitted with a metallic conventional cutter insert 22, shown in phantom lines in FIGS. 2, 3 and 4. The insert 22 will project against the work piece 14 and as the piece is rotated a bore or opening 24 may be cut in the work piece.

Figure 6:
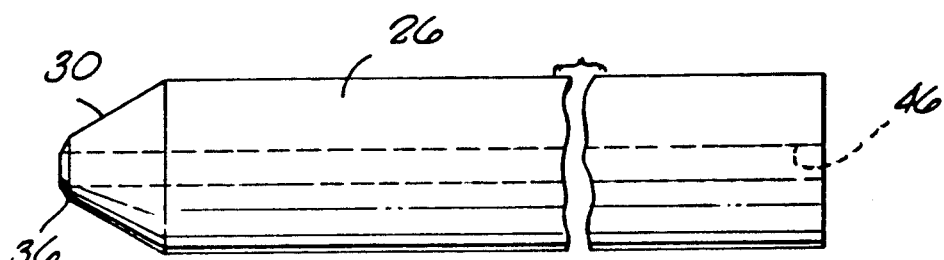
FIG. 6 is a side elevated view of the carbide boring bar blank of FIG. 5 with a lubrication bore passing axially therethrough and a forward tapered end.

Boring bars have been used for many years and for some time they have been constructed of a cemented tungsten carbide metal known simply as "carbide" forming an elongated axial carbide rod or blank 26 (FIG. 5). When finished an outer end 28 (FIG. 6) has an inner conical end 30 (FIG. 6). Secured to the conical end portion 30 is a steel head designated 32. Traditionally, the steel head 32 is formed of a steel alloy which does not have the strength or stiffness of carbide. As a matter of fact carbide cannot be machined such as a softer steel alloy particularly in small sizes where any attempted machining would render the carbide brittle and unusable for the cutter insert receptacle.

As can be seen in some of the respective figures the inner conical end portion 30 of the rod 26 includes a conical tapered angle 35 from outer annular edge 34 inwardly to a point 36. From point 36 the end portion 30 continues at a greater angle, yet less than 90° to the angle between edge 34 and point 36 forming an annular end angle 38 which terminates at the inner end 40.

In the preferred embodiment the angle of the conical tapered angle 35 is 60°. However, in the present invention this angle may vary from 0° to 120°. It has been found that with an angle of greater that 120° the rod 26 and steel head 32 would mate in a butt joint. This would not produce a truly satisfactory brazed union.

Also the rod 26 includes a longitudinal coolant/lubricating bore 46 which runs the entire axial length of the rod 26. In this way when the boring bar 20 is in use and the insert 22 is cutting, the bore 46 will communicate with the insert 22, to be described, and the work piece 14 and insert 22 may be cooled during cutting or a lubricant may be forced through the bore 46 to lubricate the insert 22 during use.

Figure 7:
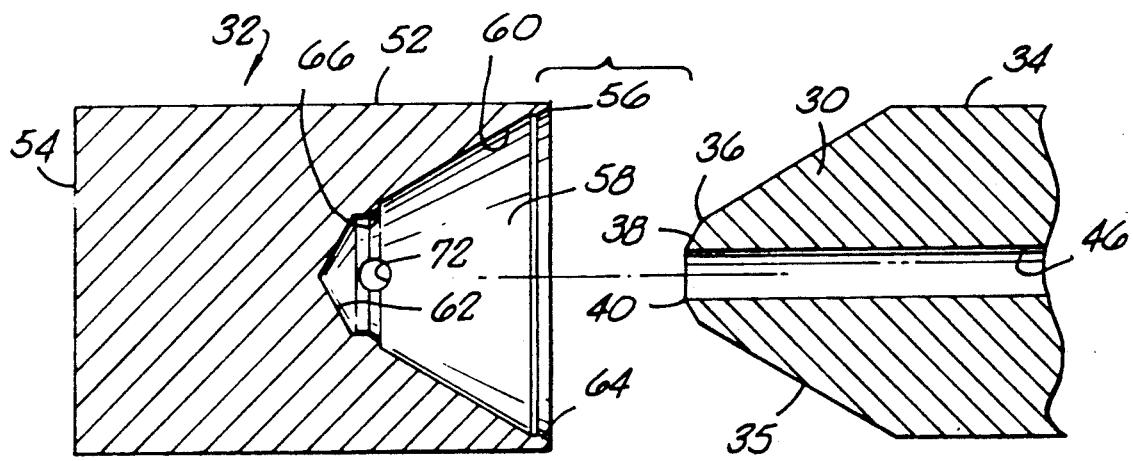
FIG. 7 is an enlarged exploded view showing the internal construction of the steel head and the exterior construction of the mating end of the male portion.
Figure 8:
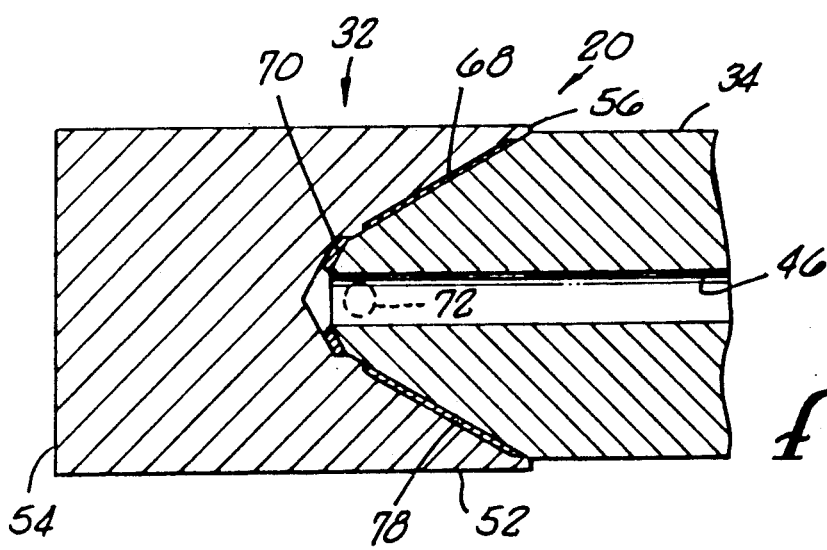
FIG. 8 is an enlarged view similar to FIG. 7 except the head and boring bar have been brazed together in a final assembly.

Now referring to the steel head 32, the blank as seen in FIGS. 7 and 8 is annular having an outer annular surface 52, front end 54 and rear end 56.

The rear end 56 of the head 32 is cut inwardly forming a cavity designated 58 of a configuration complementary with the configuration of the tapered end portion 30 of rod 26. There is an elongated annular tapered angle 60 extending inward from end 56 and there is a steeper annular inner end angle 62. The angles of surfaces 35 and 60 are complementary, as are the angles 38 and 62, see FIGS. 7 and 8.

The interior wall 60 includes an outer annular bead or stop 64 at end 56 and an inner annular bead or stop 66 between the end of the taper 60 and the beginning of taper 62. These beads 64 and 66 serve as stops for the end portion 30 of the rod 26 as it is inserted within the cavity 58 of the steel head 32. As can be seen in FIG. 8 with the insertion of the tapered end 30 into the cavity 58 there is a conical gap 68 between the tapered walls 60 and 35. In addition, there is also a conical gap 70 between the tapered end angle 38 and the steeper annular inner end angle wall 62. Because the restrictive angles are complementary the respective gaps 68 and 70 have parallel walls with the gap space varying depending upon the diameter of the carbide rod 26.

Extending inward from outer annular surface 52 of head 32 is a brazing bore 72 which passes through the bead 66 so as to communicate with both gaps 68 and 70. See FIGS. 7 and 8.

In order to secure the steel head 32 to the conical end 30 of the rod 26, the conical end 26 is inserted into cavity 54 as seen in FIGS. 2, 3 and 8. The combination is then inserted in a atmospheric vacuum chamber (not shown) where the oxygen free brazing operation is performed without the need of a flux. The preferred braze for this operation is a gold alloy which is melted into the brazing bore 72. As the braze 78 is melted it will flow into the respective annular gaps 68 and 70 bonding the carbide rod 26 and head 32 together.

It has also been found that by performing the brazing at approximately 1800° F. for a gold alloy braze in a atmospheric vacuum chamber you furnish a non-contaminate environment where there is almost pure oxygen free brazing performed without any unwanted contamination by an oxidized flux as is possible in ambient air brazing. In addition, and extremely important is the fact that no matter the diameter of the carbide rod 26 and the bore 46, which is dictated by the rod diameter no residue of a flux will remain in the bore 46 after the brazing is complete because no flux is needed to perform the operation. It has been found that the atmospheric pressure created in the chamber and the vacuum that removes oxygen also removes the need for using a flux. Thus the bore 46 will remain open and the braze only flows into and stays in the respective gaps 68 and 70.

In addition in view of the fact that the oxygen free brazing operation takes place at 1800° F. the heat will also heat treat the steel head 32.

Without the atmospheric vacuum chamber it has been found that the prior art flux methods leave the flux in the coolant bore 46. This has required a tool sufficient to remove the flux after the brazing is complete.

With carbide rods 26 of less than $\frac{1}{8}$" diameter the appropriate coolant or lubricating bore 46 is so small no appropriate tool is available to remove the unwanted oxidized flux. However, when using the atmospheric chamber for brazing the diameter of the rod 26 and respective bores 46 can be reduced without any flux remaining in the bore 46.

Also it has been found that when flux is not used the gaps 68 and 70 establish a better capillary attraction as they are free of a contaminant and a better braze results.

The brazing process is completed when the gaps 68 and 70 are filled and the braze backs up in the bore 72 to the annular surface 52.

While gold alloy braze 78 is the preferred braze it has been found that a similar alloy braze may also be used, but at a lesser heat than needed for the gold alloy.

In addition, for best brazing results it has been found that an attachment of parts at a greater angle than 120° does not produce a truly satisfactory joint. It would in reality be a butt joint where the rotation of the boring bar 20 would exert pressure along the plane of the joint and could break the joint.

When the oxygen free brazing operation has been concluded the head 32 is further processed to receive the cutting insert 22. The steel head 32 is milled to form an end cut out 80 from the surface 52 outwardly of the end 56 to the front end 54. In addition there is a flat insert resting floor 82 formed in the head 32, and a bore 84, see FIG. 2, is drilled or milled between the floor 82 and coolant or lubricating bore 46. Passing from the floor 82 through the head to surface 52 is a threaded bore 86. A screw, not shown, passes through the insert 22 into the threaded bore 86 to fix the insert 22.

With the new method of oxygen free brazing of the pieces together there is created a boring bar and head that has no flux residue left in the bore 46 during brazing and the finished boring bar 20 is immediately ready for use. With such an end product the diameter thereof may be reduced considerably under $\frac{1}{8}$".

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. We do not wish to be restricted to the specific forms shown or uses mentioned, except as defined in the accompanying claims, wherein various portions have been separated for clarity of reading and not for emphasis.

We claim:

1. In a boring bar with coolant/lubricant bore for use with a cutting machine having a tool holder to receive said boring bar, said boring bar being formed of a carbide rod and having a steel head affixed thereon, said steel head being machined to provide a pocket adapted to receive a cutting insert which in turn will cut an opening in a work piece held in said cutting machine, and said coolant/lubricant bore communicates with said pocket and is adapted to receive and dispense to said pocket and said insert a liquid coolant or lubricant, the improvement comprising:

said boring bar and said steel head each having a diameter less than one half an inch and said coolant/lubricant bore having a bore diameter at least less that one-half the diameter of said boring bar, and said steel head and said boring bar brazed together in an oxygen free atmosphere without flux wherein no contaminant residue remains in said coolant/lubricant bore after said brazing is completed.

2. In a boring bar as defined in claim 1 wherein:

said carbide boring bar including one end which has a first conical taper along the majority of its length, said conical portion terminating in a relatively steep second tapered conical portion relative to the taper of said first conical end and said end being normal to a longitudinal axis passing through the length of said coolant/lubricant bore; and said steel head having an end which has a cavity therein complementary with said first and second conical tapered portion of said boring bar and adapted to be inserted thereon and be fused therewith.

3. In a boring bar as defined in claim 2 wherein said steel head includes a first annular rib adjacent said end and a second annular rib formed at the junction of said first conical taper portion and said second tapered conical portion, said ribs acting as stops when said boring bar is inserted into said steel head cavity;

a pair of annular oxygen free braze receiving spaces between said first and second conical taper portions; and an oxygen free brazing hole extending inward from an outer annular surface of said head and passing through said second rib communicating with said spaces.

4. In a boring bar as defined in claim 3 wherein:

liquified non-flux braze at high temperature is forced through said braze hole into said spaces fusing said carbide boring bar and said steel head together when said braze has cooled.

5. In a boring bar as defined in claim 2 wherein the taper of said first conical taper portion is between 46° and 119°.

6. In a boring bar as defined in claim 2 wherein the taper of said first conical taper portion is 60°.

7. A method of fixing a steel head, adapted to receive a metal cutting insert, to a carbide boring bar of less than one half inch in diameter having a coolant/lubricant bore through the length thereof which combination is adapted to be used with a metal cutting machine having a tool holder to receive said boring bar including the steps of:

forming a first frusto conical end on said boring bar;

forming a complementary conical cavity defined by a conical wall in an end of said steel head and forming a braze hole therein communicating with said cavity;

machining an annular spacer rib on said conical cavity wall;

inserting said frusto conical end of said boring bore into said cavity to abut said spacer rib, wherein an annular braze space is formed between said cavity wall an said frusto conical end;

fitting an atmospheric vacuum chamber with brazing equipment and jig means to retain said boring bar and steel head together;

activating said chamber to expel oxygen and activating said brazing equipment;

forcing flux free braze into said braze hole and thus into said braze space, in said oxygen and contaminant free atmosphere.

8. A method as defined in claim 7 wherein said conical end of said boring bar includes the additional step of:

forming a second conical taper on said conical end at a different yet steeper angle than the angle of said first frusto conical end.

9. A method as defined in claim 8 wherein forming said braze hole includes the step of:

positioning the same to intersect said first and second conical tapered portions at their junction.

10. A method as defined in claim 7 presenting two different conical angles and in turn two different braze spaces due to the complementary character of said cavity.

* * * * *